United States Patent Office

3,796,696
Patented Mar. 12, 1974

---

3,796,696
SKIN-PACKAGING POLYMER AND PROCESS
Francis E. Brown, Orange, Tex., assignor to Gulf Oil Corporation, Pittsburgh, Pa.
No Drawing. Continuation of abandoned application Ser. No. 361,254, Apr. 20, 1964. This application Feb. 15, 1968, Ser. No. 705,858
Int. Cl. C08f 1/06
U.S. Cl. 260—87.3    4 Claims

---

ABSTRACT OF THE DISCLOSURE

Ethylene-vinyl acetate copolymers having unique optical and physical properties are prepared by the bulk high-pressure copolymerization of ethylene and 5 to 8 mol percent of vinyl acetate.

---

This application as a continuation of application Ser. No. 361,254, filed Apr. 20, 1964, and now abandoned.

This invention relates to copolymers of ethylene and vinyl acetate having a unique and highly advantageous combination of optical and physical properties. In a particular aspect the invention concerns processes and techniques for preparing such copolymers and further concerns novel packaging processes utilizing such copolymers and novel packages so produced.

Recently the packaging industry has developed a method known as "skin-packaging" which is highly useful in either the packaging of relatively inexpensive items such as combs, small toys, etc., for display purposes, or in the packaging of more expensive items such as electrical components, precision machine parts, etc., where it is desired to protect these expensive items from contamination and loss. Even more recently, the skin-packaging process has been used in the packaging of food products such as bacon, cold meats, and the like.

The skin-packaging process consists of placing the item to be packaged upon a semi-porous substrate such as paper or cardboard, covering the substrate and the article placed thereon with a thin film, usually transparent, of a thermoplastic material, heating the thermoplastic film to a temperature at which it will adhere to the substrate ("tack temperature"), and applying a vacuum to the other side of the substrate whereby air which is entrapped between the heated film is drawn down into adhering contact with the substrate, the film forming an integument for the article and securing the article against the surface of the substrate. Subsequently, the film is allowed to cool, thereby producing a unitary assembly of substrate, article, and film known as a "skin-pack."

Since the substrate typically bears printed material thereon and since one of the principal applications of this technique is the display of the packaged item to prospective purchasers, it is highly desired that the thermoplastic film used in the skin-packaging process have excellent optical properties. Iit is also necessary that the thermoplastic have certain minimum physical properties dictated by the mechanics and the economics of the skin-packaging process and by the environment to which the skin-pack will be subsequently exposed. For example, the thermoplastic resin must be one which can be satisfactorily extruded into thin films by melt extrusion techniques, the softening temperature of the thermoplastic resin must be sufficiently low that it does not require an inordinate length of time to heat the film to its softening point prior to applying the vacuum, the temperature at which the film "burns" must be sufficiently higher than the tack temperature, i.e., the tack-burn differential must be sufficiently great enough to permit one to perform the skin-packing operation without danger of exceeding the "burn" temperature, the tensile elongation of the film must be great enough that the film is easily deformed around the article being packaged without tearing the film, and the stress crack resistance of the film must be great enough that the film does not fail subsequently at the points where deformation is greatest. In addition, when the film is likely to be subjected to low temperatures, as in food packaging applications, it is necessary that the film have high resistance to low temperature brittleness.

Unfortunately, many of the above requirements are self-contradictory, especially the requirements that the film have excellent optical properties, that the film be easily formed by melt extrusion techniques, and that it have a low tack temperature. For example, a conventional polyethylene resin which has a tack temperature low enough to permit a short cycle time in the skin-packing operation will generally be of such low molecular weight that it is difficult to fabricate the polyethylene resin into thin films; also, the optical and strength properties of such a film would not be acceptable. Alternatively, if one employs a conventional polyethylene resin which is suitable for conversion into thin optically acceptable films by melt extrusion the tack temperature will be too high for economical operation of the skin-packing process and the tack burn differential will be too small.

I have now discovered a copolymer of ethylene and vinyl acetate having a unique combination of optical and physical properties which can be used in a highly advantageous manner in the skin-packaging process. This copolymer is a normally solid resinous copolymer of ethylene and vinyl acetate contained copolymerized therein from five to eight mol percent vinyl acetate, having a Vicat softening point of from 60° to 90° C., an inherent viscosity (measured in Decalin at 130° C.) of from 0.85 to 1.15 and less than 35% crystallinity as measured by differential thermal analysis. For example, a typical copolymer of my invention possesses a unique and unusually advantageous combination of optical and physical properties as follows:

| | |
|---|---|
| Density | 0.9396. |
| Melt index | 1.4. |
| Tack temperature | 260° F. |
| Tack-burn differential | 133° F. |
| Skin-pack cycle time | 1 minute. |
| Tensile at break | 2,590 p.s.i. |
| Tensile elongation | 730%. |
| Stress crack resistance | 0 failures/14 days. |
| Low temperature brittleness | 0/10 at −70° C. |
| Haze | 2.8. |
| Gloss | 121.1. |
| Transparency | 72.0. |

(The test methods used in determining the above values are explained hereafter in connection with the working examples.)

The foregoing advantageous combination of strength and optical properties of the copolymer of my invention is especially surprising since, heretofore, it has been generally considered that ethylene-vinyl acetate copolymers having a vinyl acetate content within the range hereabove mentioned would be difficult to process into film form because of low molecular weight, that resins of low crystallinity would be deficient in strength properties, and that resins having a Vicat softening point within the range above specified would have objectionable optical properties. By contrast, however, it will be noted from the above list of properties that the copolymers of my invention have melt-flow properties (melt index) of which are suitable for ease of fabrication into thin films, rheological properties (tack temperature, tack-burn differential) which are imminently suited to economical operation of the skin-packaging process (short cycle time), and mechanical properties (tensile, stress-crack, elongation, low temperature brittleness, impact strength) which are especially suited to the requirements of the skin-packaging process. In addition, the copolymer films have excellent adhesion properties which is also a clear requirement of the skin-packaging process.

In addition to their use in skin-packaging processes the copolymers of my invention are advantageously employed in preparing exceptionally clear unsupported films, as high gloss coating resins, as laminating resins, in the fabrication of clear tubing and clear blown bottles, in the fabrication of high-impact film and packaging material and in other miscellaneous applications such as the exterior coating of milk cartons and the like to improve gloss and mar resistance. These copolymers are directly emulsifiable without the usual thermal or oxidative degradation of the polymer as is necessary in the preparation of emulsions of pre-formed polyethylene.

The novel copolymers hereabove described are prepared in accordance with my invention by techniques, which, with the critical exceptions hereafter noted, are commonly employed in the so-called "high pressure" free radical catalyzed polymerization process for the preparation of polyethylene and related ethylene copolymers. In such a process an ethylene feed stream or a feed stream composed of a mixture of ethylene and a comonomer is contacted with a free radical generating polymerization initiator in a polymerization zone at an elevated pressure and at a polymerizing initiation temperature (hereinafter defined). The polymerization mixture comprising polyethylene or ethylene copolymer and unpolymerized monomer is continuously withdrawn from the polymerization zone at a rate substantially equal to the monomer feed rate and the product is recovered and unreacted monomer is recycled to the polymerization zone.

The free radical generating polymerization initiators employed in preparing the copolymers of the present invention have relatively short half-lives. Thus, suitable initiators which may be employed have half-lives of from about 5 to about 50 minutes and desirably from about 20 to about 40 minutes at 185° F. as determined by the method of Doehnert and Mageli, Modern Plastics 36, 142 (February 1959). For example, Table 1 lists several of the initiators which are preferred in the practice of the present invention.

TABLE 1

| Initiator: | Half-life at 185° F., minutes |
| --- | --- |
| Lauroyl peroxide | 30 |
| Deconoyl peroxide | 30 |
| Caprylyl peroxide | 30 |
| Tertiarybutyl peroxypivalate | 25–30 |
| $\alpha,\alpha'$-azobisisobutyronitrile | 40 |

In contrast to the initiators employed in the practice of the present invention, initiators such as tertiarylbutyl peroxide, tertiarylbutyl peracetate and tertiarybutyl perbenzoate, which are commonly employed in the known prior art processes, have half-lives at 212° F. of 218 hours, 18 hours and 17 hours respectively. Of course, the above-mentioned compounds would have even longer half-lives at 185° F. which is the temperature at which the half-lives of the initiators employed in the present invention are measured. The initiators employed herein are introduced into the polymerization zone in a conventional manner, for example, by dissolving the initiator in a suitable solvent and injecting the initiator solution directly into the polymerization zone.

Since the polymerization reaction is exothermic, a temperature gradient will ordinarily exist within the polymerization zone, with generally lower temperatures prevailing to the point of initial contact between the ethylene-vinyl acetate feed stream and the polymerization initiator and with generally higher temperatures prevailing downstream from that point. After a short induction time the copolymerization of the ethylene and vinyl acetate feed begins and the bulk of the chain-propagation and chain-growth occurs within a relatively well-defined portion of the polymerization zone which, for convenience, will be termed herein as the "high molecular weight zone" as any chain initiated within this zone is likely to become a high molecular weight molecule. The lowest temperature within the high molecular weight zone is defined herein as the "initiation temperature." In preparing the novel copolymers hereabove described, it is necessary that one maintain a polymerizing initiation temperature which does not substantially exceed 350° F. and preferably less than 325° F. In general, the highest temperature within the high molecular weight zone will not exceed the initiation temperature by more than about 30–35° F. The control of initiation temperature is advantageously accomplished by adjusting the ratio of initiator to ethylene-vinyl acetate feed injected into the polymerization zone.

Another process parameter which is critical in the preparation of the above-described novel copolymers is the pressure within the polymerization zone. It is necessary that this pressure be maintained at least as high as 19,500 p.s.i.g., suitably from 19,500 p.s.i.g. to 28,000 p.s.i.g., preferably at about 23,000 p.s.i.g.

Adjustments in the properties of the copolymer such as density, molecular weight, inherent viscosity, etc., can be effected to a limited extent by adjusting the various process parameters such as pressure, temperature, residence time, the use of telogens, for example propane or various aldehydes, e.g., butyraldehyde, and the use of polymerization inhibitors, for example 2,6 - ditertiarybutyl-4-methylphenol, according to techniques which are known in the polymerization arts. Of course, the vinyl acetate content of the copolymer can be controlled by adjusting the ratio of ethylene to vinyl acetate present in the feed stream to the polymerization zone. The ratio of ethylene to vinyl acetate required to produce a copolymer having a specific vinyl acetate content will depend somewhat upon the specific catalyst and specific reaction conditions employed and the determination of the exact ethylene-vinyl acetate feed ratio can be accomplished by routine experimentation by persons of ordinary skill having regard for the invention herein disclosed. In general, a feed stream containing from about 1.0 to about 4.0 mol percent vinyl acetate is employed to obtain copolymers having the minimum acceptable vinyl acetate content of 5 mol percent and a feed stream containing from about 3.0 to about 6.0 mol percent vinyl acetate is employed to obtain copolymers having the maximum acceptable vinyl acetate content of 8 mol percent.

The optical properties of the films prepared from the copolymers of this invention are a function of the characteristics of both the surface and the interior of the film. The optical characteristics associated with the interior of the film are mainly a function of the crystallinity of the copolymer resin while the surface optical characteristics appear to be mainly dependent upon the molecular weight of the resin. Thus, I have discovered that as little as 15% crystallinity in the copolymers has a detrimental effect upon the film optical properties, as much as 35% crystallinity rendering the film unsuitable for use as aforesaid due to unacceptable optical properties.

The following examples are presented to illustrate the practice of my invention and the preferred embodiments thereof. In each of the following examples, ethylene under pressure and of a temperature of about 100° F. is continuously introduced, along with vinyl acetate co-monomer where indicated, through a feed inlet into the top of a stirred polymerization reactor. The polymerization initiator is continuously introduced into the reactor and mixed with the ethylene feed at a point adjacent to the feed inlet.

A thermocouple positioned at the confluence of the feed and initiator streams measures the "initiation temperature"

(hereinbefore defined). The initiation temperature is controlled by regulating the ratio of initiator to feed.

The polymerization mixture comprising polyethylene or copolymer and unpolymerized monomers is withdrawn from the bottom of the reactor through a "let-down" valve at a rate substantially equal to the monomer feed rate. The pressure within the reactor is controlled by regulating the pressure drop across the let-down valve. The polymer is separated and recovered from the polymerization mixture and unpolymerized monomers are recycled to the feed inlet.

EXAMPLE I

This example illustrates the preparation of an ethylene-vinyl acetate copolymer in accordance with my invention. A feed stream of ethylene and vinyl acetate monomers containing 1.25 mol percent vinyl acetate and containing propane as a telogen (3 weight percent) is continuously polymerized as aforesaid under a pressure of 23,000 p.s.i.g. while maintaining an initiation temperature of 325° F. The catalyst employed is decanoyl peroxide.

The copolymer resin so produced and film fabricated therefrom have the following properties (for comparison similar data for ethylene homopolymer resins are set forth):

TABLE 1

| Property | Copolymer | Polyethylene Resin A | Polyethylene Resin B |
|---|---|---|---|
| Vinyl acetate content, mol percent | 5.62 | 0 | 0 |
| Density,[1] g./cc. | 0.9396 | 0.9169 | 0.9330 |
| Inherent viscosity[2] | 1.10 | 0.966 | 1.011 |
| Melt index[3] | 1.4 | 13.8 | 1.52 |
| Vicat softening point,[4] ° C. | 74.3 | 86.5 | 114 |
| Skin pack cycle time, minutes | 1 | | 2½ |
| Tack temp., ° F. | 260 | 263 | 325 |
| Seal temp., ° F. | 270 | 320 | 363 |
| Tack-burn differential, ° F. | 133 | 90 | 98 |
| Tensile at break,[5] p.s.i. | 2,590 | 1,370 | 1,620 |
| Tensile at yield,[6] p.s.i. | 870 | 1,200 | 2,530 |
| Tensile elongation,[7] percent | 730 | 582 | 190 |
| Dart-drop impact strength,[8] g. | 465 | 71.5 | 42.8 |
| Stress crack resistance,[9] percent failures/exposure time | 0/14 days | | 100/30 min. |
| Low temperature brittleness,[10] percent failures at −70° C. | 0 | 10 | 0 |
| Optical transmission[11] | 72.0 | <30 | 67 |
| Haze[12] | 2.8 | >8.0 | 3.0 |
| Gloss[13] | 121.1 | 120 | 100 |
| Crystallinity, percent | 31 | | |

[1] ASTM-D-1505-60T.
[2] ASTM-D1601-61 (130° C.).
[3] ASTM-D-1238-62T.
[4] ASTM-D-1525-58T.
[5] ASTM-D-638-61T.
[6] ASTM-D-638-61T.
[7] ASTM-D-638-61T.
[8] ASTM-D-1709-62T.
[9] ASTM-D-1693-60T (Igepal).
[10] ASTM-D-746-59T.
[11] ASTM-D-146-60T.
[12] ASTM-D-1003-59T.
[13] ASTM-D-523-53T (60°).

NOTE.—All film properties measured on 2 mil 5-inch lay-flat tubular blown films extruded under identical conditions on a 1 inch "NRM" extruder.

From the data in Table 1 it is apparent that the copolymer therein described meets all of the requisites for use in the skin-packaging process set forth hereabove. By way of comparison, polyethylene Resin A, which has a Vicat softening point low enough to permit its use in the skin-packaging process and which, because of its density, is just barely filmable, is otherwise unsuitable since it has extremely poor optical properties, particularly low optical transmission and high haze. On the other hand, polyethylene Resin B, which has barely acceptable optical properties and which is more easily converted into film form by melt extrusion techniques, is otherwise unacceptable since it has poor strength properties and since its Vicat softenpoint is too high to permit its practical use in the skin-packaging process. Polyethylene Resin B was prepared according to the techniques hereabove described, employing a polymerization reactor, pressure of 23,000 p.s.i.g., initiation temperature of 285° F. and, thus, represents a typical polyethylene homopolymer resin obtained under conditions similar to those used in the preparation of the copolymer of this invention. Polyethylene Resin A was prepared in an attempt to lower the Vicat softening point of Resin B by decreasing the polymerization pressure of 19,500 p.s.i.g. and increasing the initiation temperature to 480° F. This modification of reaction conditions did result in a lowering of the Vicat softening point but also resulted in extreme depreciation of the optical properties of the filmed resin.

Example 2

The procedure of Example 1 is repeated except that the vinyl acetate content of the feed stream was reduced to 0.73 mol percent, and the initiation temperature was maintained at 275° F. The copolymer produced had the following properties (for comparison the same properties of the copolymer of Example 1 are also listed):

TABLE 2

| Property | Copolymer of Example 2 | Copolymer of Example 1 |
|---|---|---|
| Vinyl acetate content, mol percent | 2.85 | 5.62 |
| Density, g./cc. | 0.9379 | 0.9396 |
| Inherent viscosity | 1.08 | 1.10 |
| Vicat softening point, ° C. | 110 | 47.3 |
| Tensile at break, p.s.i. | 1,570 | 2,590 |
| Tensile elongation, percent | 330 | 730 |
| Crystallinity, percent | 80 | 31 |
| Optical transmission | 37 | 72.0 |
| Haze | 7.1 | 2.8 |
| Gloss | 92 | 121.1 |

It will be noted from Table 2 that although all other process variables are held within the ranges hereabove specified for the preparation of the novel copolymers of my invention, the copolymer of Example 2 which contains less than the necessary amount of copolymerized vinyl acetate does not possess the unique combination of strength, optical, and rheological properties possessed by the copolymers of the invention and is unsuited for advantageous use in the skin-packaging process.

EXAMPLE 3

The procedure of Example 1 is repeated except that the reactor pressure is maintained at 14,800 p.s.i.g. and the initiation temperature is maintained at 350° F. The properties of the copolymer produced are set forth below:

TABLE 3

| Property: | Copolymer of Example 3 |
|---|---|
| Vinyl acetate content, mol percent | 6.4. |
| Density, g./cc. | 0.9371. |
| Inherent viscosity | 0.8. |
| >Melt index | 7.3. |
| >Vicat softening point, ° C. | 66. |
| >Percent crystallinity | 15. |
| >Tensile at break, p.s.i. | 1,570. |
| Tensile elongation, percent | 790. |
| Stress crack resistance | 100/17 hours. |
| Optical transmission | 7. |
| Gloss | 46. |
| Haze | 15. |

This example illustrates that even though all other process variables are held within the ranges hereabove specified for the preparation of the novel copolymers of this invention, copolymer produced at a pressure below 19,500 ps.i.g. has unacceptable optical and strength properties even though it contains the requisite amount of copolymerized vinyl acetate.

Having now fully described my invention the preferred embodiments thereof,

I claim:

1. In a continuous process for the manufacture of an ethylene-vinyl acetate copolymer by a continuous process which comprises (1) continuously feeding a mixture of ethylene and vinyl acetate into the top of a stirred, high-pressure reactor, (2) continuously feeding a solution of a free-radical generating polymerization initiator into the reactor to mix with the feedstream of ethylene and vinyl acetate, and (3) continuously withdrawing a stream of ethylene-vinyl acetate copolymer and unpolymerized ethylene and vinyl acetate monomers from the reactor; the improvement in said process comprising, in combination, the steps of;

(a) Maintaining the mol ratio of vinyl acetate to ethylene in said polymerization mixture to provide a copolymer product having copolymerized therein 5 to 8 mol percent vinyl acetate, (b) Maintaining a pressure in said reactor above 19,500 p.s.i.g., (c) Employing in the process a free-radical generating polymerization initiator having a half life of from about 5 to 50 minutes at 185° F., (d) Maintaining an initiation temperature in said reactor of less than 350° F., and (e) Maintaining a final temperature in said reactor so as not to exceed the initiation temperature by more than 35° F.

2. The process of claim 1 wherein the polymerization initiator is decanoyl peroxide.

3. The process of claim 1 to include introducing a polymerization inhibitor into said polymerization zone.

4. The process of claim 3 wherein said polymerization inhibitor comprises 2,6-ditertiarybutyl-4-methyl phenol.

References Cited

UNITED STATES PATENTS
3,029,230   4/1962   Strauss _____ 260—87.3

FOREIGN PATENTS
703,287   2/1954   Great Britain _____ 260—87.3

OTHER REFERENCES
Encyclopedia of Polymer Science and Technology vol. 3, p. 628.

JOSEPH L. SCHOFER, Primary Examiner

J. KIGHT III, Assistant Examiner